United States Patent [19]
Yasui et al.

[11] Patent Number: 4,539,396
[45] Date of Patent: Sep. 3, 1985

[54] PROCESS FOR PRODUCING A COAGULATED LATEX OF SPHERICAL CONFIGURATION

[75] Inventors: Hideo Yasui, Kobe; Yasuhiro Miki, Himeji, both of Japan

[73] Assignee: Kanegafuchi Kagaku Kogyo Kabushiki Kaisha, Osaka, Japan

[21] Appl. No.: 441,216

[22] Filed: Nov. 12, 1982

[30] Foreign Application Priority Data

Nov. 19, 1981 [JP] Japan ................. 56-186644

[51] Int. Cl.³ ............................ C08F 6/22; C08F 6/12
[52] U.S. Cl. .................... 528/481; 528/500; 528/503
[58] Field of Search .............. 528/500, 503, 481

[56] References Cited

U.S. PATENT DOCUMENTS

| 2,451,332 | 10/1948 | Green | 528/500 |
| 2,465,363 | 3/1949 | Faragher | 528/500 |
| 2,615,010 | 10/1952 | Troyan | 528/500 |
| 4,277,426 | 1/1981 | Kato et al. | 264/8 |
| 4,334,057 | 6/1983 | Govoni | 528/500 |

FOREIGN PATENT DOCUMENTS

| 2850333 | 5/1980 | Fed. Rep. of Germany . |
| 53-33244 | 3/1978 | Japan . |
| 57-63332 | 5/1982 | Japan . |
| 94670 | 5/1960 | Netherlands . |
| 1516476 | 5/1978 | United Kingdom . |
| 1588467 | 4/1981 | United Kingdom . |

Primary Examiner—Christopher A. Henderson
Attorney, Agent, or Firm—Armstrong, Nikaido, Marmelstein & Kubovcik

[57] ABSTRACT

A process for producing a coagulated latex is disclosed which comprises spraying into a coagulating chamber a suspension liquid or a high polymer latex to disperse as droplets, simultaneously spraying a coagulant into the chamber in the form of gas or mist, introducing into the chamber super-heated steam to heat dispersed droplets of the suspension liquid or the high polymer latex and the coagulant, collecting coagulated particles in a film-like flow of water or an organic solvent flowing downward along side walls and the bottom of the chamber, and recovering the coagulated particles. Also disclosed is an apparatus used for practicing the foregoing process which comprises a spraying means of a suspension liquid or a high polymer latex into a coagulating chamber, a spraying means of a coagulant, a distributing means of a downward flow liquid which forms a film-like flow of water or an organic solvent covering side walls of the chamber, a means for heating and rectification by which super-heated steam is introduced and the flow of atmosphere in the chamber is rectified, a gas-liquid contacting means which brings the downward flow liquid into contact with an exhaust gas, and a means for removing slurry containing coagulated particles.

1 Claim, 1 Drawing Figure

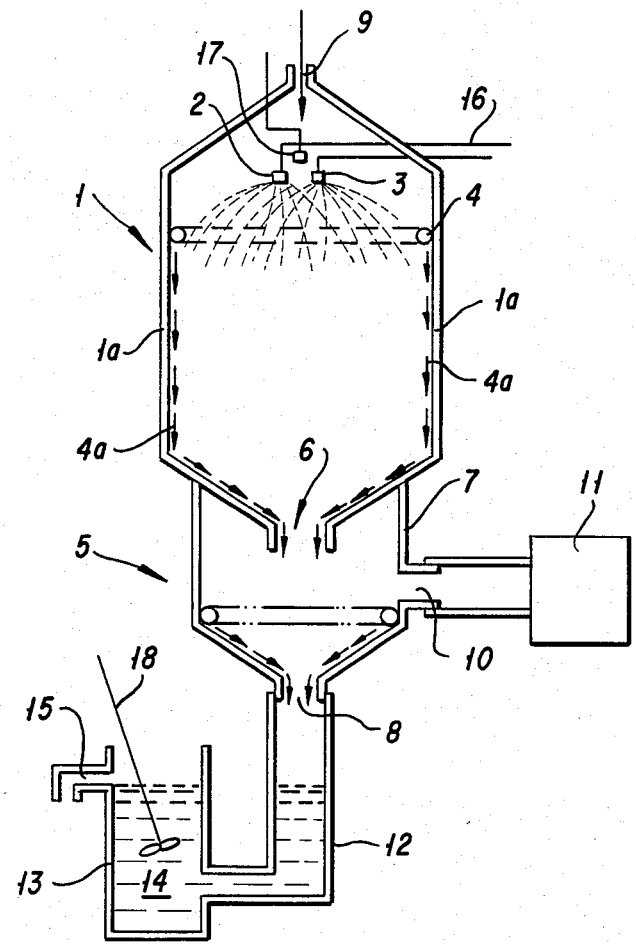

PROCESS FOR PRODUCING A COAGULATED LATEX OF SPHERICAL CONFIGURATION

BACKGROUND OF THE INVENTION

The present invention relates to a novel process for producing a coagulated latex and apparatus therefor.

Conventionally, in recovering polymer particles from a suspension liquid obtained by suspension polymerization or a high polymer latex obtained by emulsion polymerization (hereinafter, explanation will be made as to the high polymer latex), a coagulating agent such as inorganic salts, acids and the like is added to a latex, or conversely, a latex is added to an aqueous solution containing a coagulating agent and the latex is coagulated in an aqueous phase, converted to slurry through thermal treatment and the like, then subjected to dehydration and drying to thus obtain powdery polymer particles. The polymer particles, however, obtained by the process are irregular in shape, broad in particle size distribution and contains a considerably large quantities of fine powder. This causes many problems including a large expense for preventing loss of product resulting from escape of fine powder, frequent interruption of operation brought about by the plugging of passages by fine powder, contamination of the environmental atmosphere of the operating room by the escape of fine powder and the danger of explosion because of emitted fine powder. Moreover, due to the difficulty in raising bulk density of the polymer particles, expenses for transportation, storage and the like become costly. Furthermore the coagulated latex is inferior in dehydrative property and drying behavior so that an expensive dehydrating and drying equipment is necessitated to improve fluidity and anti-blocking property.

Recently, in order to overcome the deficiencies as aforesaid, a process is developed and disclosed in the Japanese Patent Non-examined Publication Nos. 3637/1977 and 30647/1978, in which coagulation and granulation of a high polymer latex is carried out simultaneously in a gaseous phase. According to the process, by dispersing a high polymer latex as droplets into a gasseous phase containing a coagulant (a gasseous coagulant or a mist of a coagulant solution), the latex is coagulated enough to hold the shape of coagulated particles formed in the gaseous phase even when hitting water or the organic solvent, then the coagulated particles are caused to enter or fall in the foregoing liquid phase to thereby be recovered. The process produces polymer particles of regular and substantially spherical shapes and of narrow particle size distribution and having good dehydrative property, drying behavior, fluidity, anti-blocking property and the like as well as large bulk density, and accordingly the foregoing problems such as loss of polymer particles, frequent operational troubles due to plugging, contamination of working environment and danger of powder explosion coming from a large amount of fine powder mingled, attendant on a process of production of a coagulated latex in a liquid phase as aforesaid are not only overcome, but reduction in cost of a dehydrating and drying equipment, utilities, transportation, storage and the like is resulted.

An apparatus for producing a coagulated latex in a gaseous phase is develoved and disclosed by the assignee of the present invention in the Japanese Patent Non-examined publication Nos. 33244/1978 and 137873/1978. An apparatus disclosed in No. 33244/1978 is comprised of a coagulating chamber, a means for spraying into the chamber a high polymer latex as droplets having an average particle size ranging from several microns and several millimeters, a means for dispersing in the chamber a coagulant to form a coagulating atmosphere, a receiving tank, located under the chamber, filled with a liquid in which the coagulated polymer particles are collected, and a means for removing from the receiving tank slurry containing the coagulated polymer particles.

In the apparatus as aforesaid, nonetheless, there are involved problems; the coagulated latex particles formed in the coagulating atmosphere deposit onto the inside walls of the coagulating chamber to thereby interrupt continuous operation over a long period of time and a part of the deposited latex particles peels off to mingle with the product, degrading the quality of product.

An apparatus revealed in No. 137873/1978 is developed to eliminate those defects, wherein, in the apparatus described in No. 33244/1978, a means for distributing a downward flow liquid which causes water or an organic solvent to flow downward on or along the inside walls of the coagulating chamber is provided, and further a means for contacting a gas and a liquid, if necessary, is provided at the bottom of the chamber. In this apparatus, the coagulated particles arrived at the inside walls of the chamber are washed down with the downward flow liquid and thus no coagulated particles deposit onto the inside walls of the coagulating chamber. Moreover, when steam, air and the like are introduced into the coagulating atmosphere to serve as a spraying medium of the high polymer latex or the coagulant, otherwise, a diluent gas is introduced therein for the adjustment of concentration of reactants in the coagulating atmosphere, the coagulated particles are likely to be entrained by exhaust gas, but in the apparatus the coagulated particles entrained by the exhaust gas are collected by bringing the downward flow liquid into contact with the exhaust gas through the gas-liquid contacting means, as a result, loss of coagulated particles is prevented and the coagulant and the like contained in the exhaust gas were removed to thereby prevent environmental contamination.

Notwithstanding, said apparatus described in No. 137873/1978 involves the following problems. That is, when a high polymer latex or a coagulant is introduced from a top of a coagulating chamber through a spraying device, atmosphere in the chamber is partly disturbed or a flow such as a rotating flow takes place. This phenomenon is vigorous when a two-fluid nozzle as a spraying device and steam or air as a dispersing medium are employed. Moreover when a centrifugal disc is used, a vertical air current occurs through a high-speed rotation of it. The vertical air current also occurs through the generation of steam, when a downward flow liquid of a high temperature is employed to raise the coagulation temperature. By the turbulence of the atmosphere, reactants and reaction products are whirled up at the top of the chamber to adhere to a top cover, a spraying device and the like, by which normal operation is difficult to continue and a long-period continuous operation is hindered. That is, said apparatus disclosed in No. 137873/1978 neither prevent effectively the occurrence of turbulent air current nor prevent reactants and reaction products from depositing onto the top cover, the spraying device and the like. In the apparatus, though exhaust is effected through a gas-liquid contacting means located at the bottom of the chamber, reacting atmosphere, especially a flow of atmosphere at the top of the chamber is not adequately rectified, and hence turbulence of atmosphere occurs at the top of the chamber, in particular, with a result that reactants and reaction products are not prevented from depositing onto the top cover and the spraying device. Moreover a downward flow liquid distributing means used in said apparatus is comprised of a ring-shaped pipe, located along the peripheral walls, having many holes directing to the coagulating chamber, by which whirling up of the reactants and the reaction products at the top of the chamber is not yet prevented. Furthermore, the apparatus described in No. 137873/1978 is so designed that the downward flow liquid having collected the reaction products is allowed to flow downward naturally from a removal outlet positioned in the air under the gas-liquid contacting means, but exhaust in the chamber is difficult owing to aspirating of the air into the chamber from said removed outlet, even if possible, a sucking means of a large capacity has to be used.

Besides the foregoings, said apparatus further involves the problems as set forth below. That is, in the apparatus a great amount of polymer scales is formed in and deposit, in a short period of time, only a supply pipe for supplying latex to the spraying device, which makes it impossible to supply latex in a desired amount per unit time to the spraying device. At the same time, the spraying of latex becomes unstable to thus prevent continuous operation for a long period of time—for four-day continuous operation, at longest.

Still worse, since the spraying device of the high polymer latex is located in the open coagulating atmosphere, the coagulating atmosphere intrudes into the spraying device, prior to supply of latex upon commencement of operation or at the time of stoppage of supplying latex upon suspension or termination of operation. Especially when head pressure of latex is not maintained, even the supply pipe is filled with the coagulating atmosphere. In such cases latex is coagulated to be solid therein by contact with the coagulating atmosphere, with which the spraying device and the supply pipe are choked up, continuous operation being thus disturbed.

Revealed in the Japanese Patent Application No. 139103/1980 is an apparatus in an attempt to solve such defects. That is, in the apparatus of production of coagulated latex comprising a coagulating chamber, a spraying means for dispersing a high polymer latex as droplets into the chamber, a means for forming a coagulating atmosphere in the chamber with which the latex droplets are coagulated, and a means for removing from the chamber slurry containing coagulated particles of high polymer latex, it is characterized in that a means for distributing downward flow liquid which forms a film-like flow of water or an organic solvent covering, at least, the greater part of the top of the coagulating chamber and causes it to flow downward along the side walls, after hitting it against the side walls, a means for rectifying the flow of atmosphere in the coagulating chamber by introducing air from the top of the chamber and forcing it to discharge from the bottom thereof, a gas-liquid contacting means for bringing the downward flow liquid into contact with the exhaust gas, a slurry removing line connected to the lower portion of the gas-liquid contacting means and a slurry receiving tank connected to the slurry removing line, said slurry removing line being connected airtight to said slurry receiving tank in such a manner that air may not flow backward in the slurry removing line by forced exhaust of said rectification means, and a supply pipe for supplying the high polymer latex to said spraying means having the inside finished surface of buff 200 or more and a diameter such that the shear stress on the inside surface of the pipe is 100 g/cm·sec$^2$ or more.

The apparatus succeeded in solving the defects attendant on the apparatus of No. 137873/1978, there are still involved problems including coloration and thermal degradation resulting from oxidation of coagulated particles caused by introduction of air.

Moreover, as an important problem common to all conventional apparatus, at atmospheric prissure those are only applied to synthetic resins having Vicat softening point (hereinafter referred to "softening point") not higher than 100° C. When those are applied to synthetic resins having softening point exceeding 100° C., softening point has to be lowered beforehand by addition of a suitable solvent. That is because, when such high heat-resistant resins are subjected to the conventional apparatus, only soft and fragile spherical coagulated particles are obtained and those particles are destroyed by impact upon being collected in the downward flow liquid along the side walls, to be fine powder of irregular shapes.

In application of those high heat-resistant resins to the conventional apparatus, the system is considered to be placed under an increased pressure to keep the temperature of the coagulating chamber at the vicinity of high softening point, but it is not advisable in practice because of many difficulties on equipment including an increase in cost for remodeling it to a pressure-resisting apparatus and high technology required for a removal-supply system.

SUMMARY OF THE INVENTION

It is therefore an object of the present invention to provide a process for producing on an industrial scale coagulated latex of synthetic resins with a wide range of softening point, especially synthetic resins having high softening points.

It is another object of the present invention to provide an apparatus suitably used for practicing the foregoing process on an industrial scale.

These and other objects of the present invention together with the advantages thereof will become apparent to those skilled in the art from the detailed disclosure of the present invention as set forth hereinbelow.

BRIEF DESCRIPTION OF THE DRAWING

FIG. 1 is a vertical sectional view illustrating an embodiment of an apparatus used in the present invention.

DETAILED DESCRIPTION OF THE INVENTION

The present invention is concerned with a process for production of a coagulated latex that in a process for producing a coagulated latex by spraying into a coagulating chamber from the upper portion thereof a high polymer latex to thus disperse in a desired droplet diameter, spraying simultaneously into the chamber a coagulant of the high polymer latex to thus disperse in the form of gas or mist, and coagulating the high polymer latex by contacting the high polymer latex droplets with the coagulant, it is characterized by introducing into the coagulating chamber super-heated steam to heat the dispersed high polymer latex droplets and the dispersed coagulant, collecting coagulated particles in a film-like flow of water or an organic solvent which flows downward on side walls and the bottom of the coagulating chamber, and recovering the coagulated particles.

In the process of the present invention, since super-heated steam is introduced into the coagulating chamber, the droplets of the high polymer latex and the coagulant are heated up momentarily to the vicinity of 100° C. to thereby vaporize a part of water contained in the latex droplets and the coagulated particles generated. As a result, not only is the coagulation velocity enhanced remarkably, but a part of water contained in the coagulated particles evaporates concurrently with the progress of hardening of the coagulated particles at a high temperature in the neighborhood of 100° C., to thus increase the shape-holding strength of the coagulated particles. Hence it is applicable to synthetic resins having the softening point higher than 100° C. Accordingly it needs neither decreasing of the softening point by addition of a solvent to thus reduce the cost, nor a step of removig the solvent in the latter stage.

That is, when a high polymer latex is dispersed in super-heated steam, the temperature of latex droplets rises momentarily. The temperature the droplets can reach is the temperature at which the vapor pressure of the droplets becomes equal to the pressure in the coagulating chamber. For instance, in the case of water droplets, the temperature is 100° C. at atmospheric pressure.

In addition, since the temperature of the high polymer latex droplets is enhanced, the coagulation velocity is increased and the hardening of the coagulated particles is performed ("Hardening" herein means that the coagulated particles come to have a great shape-holding strength and thus become difficult to break).

Super-heated steam used in the present invention should preferably have a temperature ranging from about 110° C. to about 400° C. As this temperature lowers, the amount of super-heated steam required increases. When the amount of super-heated steam introduced increases, the flow pattern becomes turbulent. As a result, unreacted latex is caught in the downward flow liquid and the coagulated particles mixed with latex deposit on the surfaces of walls and the nozzle, thereby the desired particles not being obtained. Moreover heat of condensation of a great amount of steam raises the temperature of the downward flow liquid and causes it impossible to maintain the balance between the coagulation temperature (temperature in the reactive portion) and the temperature of slurry removed, deteriorating powder properties of the product obtained. As a measure thereagainst, a process for increasing the amount of exhaust to enhance the rectification effect and a process for increasing the amount of downward flow liquid while reducing the amount of latex supplied are considered, but those are not recommended because a decrease in the residence time as well as the spraying density is unavoidable and the amount of latex disposed is reduced per unit volume of equipment, the equipment efficiency being thus reduced. When super-heated steam having the temperature lower than 110° C., this phenomenon becomes prominent.

On the other hand, the upper limit of super-heated steam is not determined by coagulating conditions in the coagulating chamber, but by materials and heat efficiency of incidental equipments such as a heating device for heating steam and a duct for introducing super-heated steam to the coagulating chamber, and is about 400° C. from a viewpoint of economy.

One of features of the present invention is that because of conducting coagulation and hardening at such a high temperature, the coagulation reaction takes place very rapidly with short residence time, the space in the coagulating chamber being thus saved.

Such an effect can not be obtained when heated air is used, for, in the case of heated air, the temperature of the droplets only rises up to the wet-bulb temperature and hence an increase in the coagulation velocity is not expected.

Moreover, since the temperature of the droplets of the high polymer latex goes up, residual high-boiling point monomers evaporate in an extreme short time and thus omission of the removal step thereof being possible from the after-treatment step.

Furthermore, because the inside of the coagulating chamber is isolated from air, oxidation of the coagulated particles is not only prevented to thus raise the quality of the product, but the process can be applied even to synthetic resins to which it has never been available heretofore.

As stated above, particles coagulated and hardened at a high temperature have great shape-holding strength so that they are not destroyed by impact when collected in the film-like flow flowing downward on the surfaces of the walls.

In particular, in the case of synthetic resins having the softening point not higher than 100° C. which could also be treated by the conventional apparatus, heat-treatment for hardening is achieved in the coagulating chamber simultaneously with the coagulation and accordingly spherical particles can be obtained by only subjecting coagulated particles to dehydration and drying, necessitating no heat-treatment for hardening in the latter stage.

Another advantage resulting from the use of super-heated steam is as follows. That is, super-heated steam heats high polymer latex droplets and the coagulant with sensible heat and latent heat and then condenses while heating coagulated particles and the downward flow liquid on the surfaces of walls. As a result, the lower portion of the coagulating chamber becomes to be at reduced pressure and the inside flow of the coagulating chamber is naturally rectified, so that forced exhaust is not required when the temperature of water is low or the amount of super-heated steam introduced is small. In cases where the degree of reduced pressure is low as well, strong exhaust is not required. As aforesaid, in the coagulating chamber the gentle distribution of pressure occurs and according to the state of the distribution, turbulence of the stream flowing downward in the coagulating chamber takes place to thereby increase the chance that droplets and coagulated particles collide with the surfaces of walls. It is therefore preferred to release the pressure by slightly opening the wall at the upper portion of the coagulating chamber when the upper portion of the chamber is at increased pressure. Even in the case, however, the lower portion of the coagulating chamber is not opened and hence no air is sucked to enter the inside of the coagulating chamber.

An apparatus for production of coagulated latex suitably used in the present invention is that in an apparatus for producing a coagulated latex comprising a coagulating chamber, a spraying means of a high polymer latex to disperse as droplets, a spraying means of a coagulant of the high polymer latex into the chamber, and a means for removing from the chamber slurry containing coagulated particles of the high polymer latex, it is further provided with a distributing means of a downward flow liquid which forms a film-like flow of water or an organic solvent covering, at least, the greater portion of side walls of the coagulating chamber and causes it to flow downward on or along the side walls of the coagulating chamber, a means for heating and rectification by which super-heated steam is introduced into the coagulating chamber to heat droplets in the chamber and the flow of atmosphere in the chamber is rectified, a gas-liquid contacting means which brings the downward flow liquid into contact with an exhaust gas, and a slurry removing means connected to the lower portion of the gas-liquid contacting means.

Hereinafter the apparatus of the present invention will be explained by referred to the drawing. FIG. 1 is a diagrammatic vertical sectional view illustrating an embodiment of the apparatus of the present invention.

In FIG. 1, the numeral 1 is a coagulating chamber, normally in a cylindrical shape. At the top of the coagulating chamber 1 a spraying means 2 for dispersing a high polymer latex as droplets and a spraying means 3 of a coagulant are provided. As the spraying means 2, nozzles such as a pressure nozzle and a two-fluid nozzle (it is used when steam and the like are used to serve as a dispersion medium) and a centrifugal disc and the like are employed. As the spraying means 3 of the coagulant, when the coagulant is gases such as hydrogen chloride a perforated plate type dispersing device and the like are suitably used and when salts such as sodium chloride or acids such as hydrochloric acid and sulfuric acid are used to serve as the coagulant, an ultra-fine particle generator such as a spraying gun, an ultra-sonic atomizer, a high pressure nozzle, a two-fluid nozzle and a high frequency electric device may be used, which allows an aqueous solution containing the foregoing salts or acids to disperse to be in the form of mist.

On side walls 1a at the upper portion of the coagulating chamber 1 is a distibuting means 4 of a downward flow liquid provided which forms a film-like flow 4a of water or an organic solvent, controlled to a desired temperature, covering, at least, the greater part of the surfaces of the walls.

At the bottom of the coagulating chamber 1 is a gas-liquid contacting means 5, which is fabricated from a gas-liquid contacting portion 6 and a receiving portion 7 located thereunder. At the bottom of the receiving portion 7 is a slurry removal outlet 8 provided. The gas-liquid contacting portion 6 may be a wetted-wall column comprising a single pipe, a wetted wall column type perforated pipe made up of a perforated type and a dispersion plate uniformly distributing the downward flow liquid into the perforated pipe or a device providing a packed column commonly used as a gas-absorbing device, or the like.

At the top of the coagulating chamber 1 an introduction inlet 9 of super-heated steam is provided, on the other hand, at the side wall of the receiving portion 7 in the gas-liquid contacting means 5 an exhaust gas outlet 10 is provided. The exhaust gas outlet 10 is, if necessary, connected to a suchking means 11 such as a blower.

To the slurry removal outlet 8 provided at the bottom of the foregoing receiving portion 7, a slurry removal line 12 is connected, and the slurry removal line 12 is connected to a slurry receiving tank. The slurry 14 stored in the slurry receiving tank 13 is taken out by overflowing from an outlet 15 located at the upper portion of the receiving tank 13. By the foregoing constitution, the slurry removas line 12 is sealed with liquid so that air is prevented from flowing backward in the slurry removal line 12 and from mingling into an exhaust gas through the exhaust gas outlet 10.

To said spraying means 2 is a latex supply pipe 16 connected, which pipe should have the inside finished surface of buff 200 or more and a diameter such that the shear stress on the inside surface of the pipe is 100 g/cm·sec$^2$ or more.

Hereinbelow the explanation will be made as to production of coagulated latex by the use of the apparatus. By the distributing means 4 of the downward flow liquid, the film-like flow of water or an organic solvent covering the greater part of side walls of the coagulating chamber is formed. As the distributing means 4 of the downward flow liquid, flat nozzles, an overflow type conduit and a perforated ring and the like may be employed.

Through the introduction inlet 9, super-heated steam is introduced, while, if necessary, exhausting by operation of the sucking means 11 so that the pressure in the upper portion of the coagulating chamber 1 is approximately equal to atmospheric pressure. The flow of the atmosphere inside the coagulating chamber is rectified by entrance of super-heated steam.

A high polymer latex is supplied through the latex supply pipe 16 into the spraying means 2, by which the latex is dispersed as droplets, on the other hand, a coagulant is dispersed by the coagulant spraying means 3 in the form of gas or mist.

As such, droplets of the high polymer latex are coagulated in the coagulating chamber and dispersed droplets and the coagulant are heated up by super-heated steam, through which the coagulation of the high polymer latex droplets is accelerated. Most of coagulated particles formed in the coagulating chamber fall down to the bottom of the coagulating chamber, entrained on the rectified downward flow of atmosphere, but a part of them arrives at the side walls. During the travelling, residual monomers contained in the coagulated particles are evaporated, at the same time, hardening of the particles by heat progresses to enhance solidity thereof. The coagulated particles arrived at the side walls and the bottom do not deposit because the side walls and the bottom are covered with the downward flow liquid, and reach the gas-liquid contacting portion 6.

The flow of the atmosphere in the coagulating chamber is rectified according to the pressure gradient and, if necessary, by the operation of the sucking means 11 so that droplets of the high polymer latex, the coagulant and the coagulated particles are prevented from whirling and depositing at the top of the coagulating chamber. Moveover, collision and agglomeration of the coagulated particles are prevented thoroughly.

In the gas-liquid contacting portion 6, the downward flow liquid and the exhaust gas are subjected to gas-liquid contact and the coagulated particles and the coagulant are caught in a liquid phase. Accordingly loss of the coagulated particles is not only avoided, but the exhaust gas is cleaned.

Slurry containing the coagulated particles sepatated from a gaseous phase in the gas-liquid contacting portion 6 flows down to the receiving portion 7, then transported through the slurry removal outlet 8 and the slurry removal line 12 to the slurry receiving tank 13. The slurry 14 in the slurry receiving tank 13 is taken out by overflowing through the outlet 15 and transported to a solid-liquid separating device (not shown) where the coagulated particles are separated and recovered.

At the top of the coagulating chamber, a spraying means 17 for dispersing in the form of mist an aqueous solution of a third material such as dyes and hardening agents, in addition to a high polymer latex and a coagulant, may further be provided. The slurry receiving tank 13 is usually equipped with an agitating means 18 such as a stirrer, an air-bubbler and a circulating pump with a view to preventing agglomeration of the coagulated particles as well as obtaining the stable flow of slurry through the outlet 15.

Furthermore, in a preferred embodiment of the present invention a water supply pipe is connected to the latex supply pipe 16 and an automatic change over switch is provided which automatically changes from water to a latex upon commencement of supply of a high polymer latex and from a latex to water upon termination of supply thereof. According to the embodiment, water is supplied to the latex supply pipe 16 and the spraying means 2 before commencement of supply of the latex upon initiation of operation and hence the coagulant does not intrude thereinto and when the supply of the latex is stopped upon termination of operation, water is supplied immediately to thereby wash out the latex remained in the supply pipe 16 and the spraying means 2 and thus coagulating of latex therein and blocking thereof are avoided. That permits immediate reopening of operation without cleaning after termination.

Next, the invention will be explained in more detail by way of examples and comparative examples that follow, to which examples the present invention is not limited.

EXAMPLE 1

Using a coagulating chamber 1, 1500 mm in inside diameter and 4.5 m in height, equipped with a distributing means 4 of a downward flow liquid comprising a pipe, about 21 mm in inside diameter, having a plurality of holes with a diameter of 2 mm directing to side walls 1a, hot water heated to about 96° C. was flowed at a rate of 800 l/hr to form a film-like flow 4a.

Through an introduction inlet 9, super-heated steam of 220° C. was introduced at a rate of 100 Kg/hr and an amount of exhaust gas was adjusted by operation of a sucking means 11 in such a manner that the pressure in the upper portion of the coagulating chamber became to be equal to atmospheric pressure.

A spraying means 3 of a coagulant was comprised of four two-fluid nozzles, by which an aqueous solution containing 30% by weight of calcium chloride was sprayed with saturated steam of 1.2 Kg/cm$^2$G at a rate of 1.8 Kg/hr. A spraying means 2 of a high polymer latex was comprised of three pressure type hollow cone nozzles (nozzle diameter; 2 mm), by which a high polymer latex was sprayed under the spraying pressure of 3.0 Kg/cm$^2$G at a rate of 330 l/hr.

As a high polymer latex to be coagulated, α-methylstyrene-acrylonitrile-butadiene-styrene copolymer (weight ratio: 40/20/10/30, softening point: 128° C.) was employed. The latex had solid content of 31% and contained 2.6% by weight (per polymer, the same applies hereinafter) of residual α-methylstyrene monomer (B.P.: 165° C.) and 1.8% by weight of residual styrene monomer (B.P.: 125° C.).

Droplets of the high polymer latex sprayed were substantially spherical, having an average droplet size of 350μ, the largest droplet size of 840μ and the smallest droplet size of 60μ.

Under the foregoing conditions, the high polymer latex was coagulated to obtain coagulated particles and the resulting coagulated particles were subjected to heat-treatment at 125° C. for 10 minutes, then dehydrated and dried to obtain powdery spherical particles having an average particle size of 250μ (Average particle size was reduced on account of shrinkage upon heat-treatment) and bulk density of 0.49, superior in powder properties.

On the other hand, the coagulated particles removed from the coagulating chamber contained only 0.60% by weight of α-methylstyrene monomer and 0.20% by weight of styrene monomer: the greater part of residual monomers could be removed.

EXAMPLE 2

Coagulated particles and powder product were obtained in a similar manner to that of Example 1, except that the following conditions are varied.

A film-like flow was formed by flowing down water of 30° C. at a rate of 800 l/hr. As a coagulant an aqueous solution containing 15% hydrochloric acid was used and sprayed at a rate of 24 Kg/hr. Super-heated steam of 160° C. was introduced at a rate of 90 Kg/hr and exhaust was effected by operation of the sucking means so that the pressure in the upper portion of the coagulating chamber was equal to atmospheric pressure. As a spraying means of a high polymer latex, six hollow cone nozzles (nozzle diameter: 1.2 mm) were provided, through which the latex was dispersed under the spraying pressure of 3.0 Kg/cm$^2$G at a rate of 240 L/hr in the form of spherical droplets with an average droplet size of 180μ, the largest droplet size of 500μ and the smallest droplet size of 30μ.

A high polymer latex obtained by graft-polymerization of a mixture of styrene and methyl methacrylate onto polybutadiene (weight ratio: butadiene/sytrene/methyl methacrylate=45/40/15, softening point: 75° C.) was used. The latex had solid content of 30% and contained 2500 ppm of residual styrene monomer.

The coagulated particles so formed were spherical particles sufficient in the shape-holding strength, nscessitating no heat-treatment. The polymer product obtained after dehydration and drying was spherical particles having bulk density of 0.50, an average particle size of 160μ and superior powder properties. Residual styrene monomer was reduced to 420 ppm: more than 80% was removed.

COMPARATIVE EXAMPLE 1

With the exception that hot air of 220° C. was introduced at a rate of 100 Kg/hr in place of super-heated steam, coagulated particles and powder product were prepared similarly to Example 1.

The resultant coagulated particles were weak and broken out into fine particles. The particles were liable to fuse and agglomerate and difficult to handle. The powder product obtained was small in particle size (average particle size: 110μ) as well as bulk density (0.22), dusty and difficult to handle. Moreover, in the coagulated particles there were still contained 1.9% by weight of α-methylstyrene monomer and 1.0% by weight of styrene monomer.

COMPARATIVE EXAMPLE 2

Coagulated particles and powder product were produced in similar conditions to those of Example 1, excepting that a high polymer latex obtained by adding 5.0% by weight (per solid content of high polymer) of toluene to the high polymer latex used in Example 1 was employed and hot air of 220° C. was introduced at a rate of 100 Kg/hr in place of super-heated steam.

Droplets of the high polymer latex sprayed were substantially spherical, having an average droplet size of 350μ, which were the same as those obtained in Example 1. The coagulated particles were heat-treated at 97° C. for 10 minutes, dehydrated and dried to obtain powder product. The powder product was spherical particles having an average particle size of 260μ and bulk density of 0.50, and was superior in powder properties.

However, in the coagulated particles 2.1% by weight of α-methylstyrene monomer, 0.9% by weight of styrene monomer, 0.6% by weight of acrylonitrile monomer and 3.8% by weight of toluene were remained.

Those residua have to be removed, prior to processing, by drying or other suitable means because they deteriorate heat resistance property of shaped products when molded. Moreover shaped products such as tableware, when containing toluene, are not in conformity with food sanitation standards.

In order to remove such residua, a removal step has to be further provided to result in a decrease in the efficiency of manufacture equipment. Furthermore, there rise numerous problems: consumption of energy increases, environmental contamination has to be taken into account and the quality of products such as heat resistance property is degraded.

What we claim is:

1. In a process for producing a coagulated latex by spraying into a coagulating chamber from an upper portion thereof a suspension liquid obtained by suspension polymerization or a high polymer latex obtained by emulsion polymerization to disperse in a desired droplet diameter, spraying simultaneously into the coagulating chamber a coagulant of the suspension liquid or the high polymer latex to disperse in the form of gas or mist, and coagulating the suspension liquid or the high polymer latex by bringing droplets of the suspension liquid or the high polymer latex into contact with the coagulant, the improvement which comprises introducing into the coagulating chamber super-heated steam having a temperature in the range of from 110° C. to 400° C. to heat the dispersed droplets of the suspension liquid or the high polymer latex and the dispersed coagulant and to partially dry the surfaces of the dispersed droplets, collecting coagulated particles in a film-like flow of water or an organic solvent which flows downward on or along side walls and the bottom of the coagulating chamber, and recovering the coagulated particles of a spherical shape.

* * * * *